United States Patent [19]

Weihe et al.

[11] Patent Number: 4,458,806
[45] Date of Patent: Jul. 10, 1984

[54] CONVEYOR CHAIN FOR DISHWASHER SYSTEM

[76] Inventors: Clyde R. Weihe, Lindbergh Ave., Needham, Mass. 02192; Edward C. Gratto, 15 Rangeley Rd., West Newton, Mass. 02165

[21] Appl. No.: 319,161

[22] Filed: Dec. 11, 1981

[51] Int. Cl.³ .............................................. B65G 19/00
[52] U.S. Cl. .................................... 198/648; 198/725; 198/845
[58] Field of Search ............... 198/648, 725, 817, 838, 198/845, 851, 729, 834, 835, 850, 852, 735, 472, 853; 134/70-75, 124-131, 134; 104/172 C, 172 R

[56] References Cited

U.S. PATENT DOCUMENTS

| 268,883 | 12/1882 | Gowan | 198/850 |
| 1,535,785 | 4/1925 | Luce | 198/817 |
| 1,964,997 | 7/1934 | Perkins | 198/852 |
| 2,704,943 | 3/1955 | Harris | 198/852 |
| 2,724,488 | 11/1955 | Klinzing | 198/729 |
| 3,055,485 | 9/1962 | Cordis | 198/729 |
| 3,097,735 | 7/1963 | Siciliano | 198/729 |
| 3,738,478 | 6/1973 | Tourtellotte | 198/817 |
| 3,934,701 | 1/1976 | Mooney et al. | 198/648 |
| 4,004,682 | 1/1977 | Schuler | 198/852 |
| 4,148,392 | 4/1979 | Larson et al. | 198/735 |
| 4,410,081 | 10/1983 | Weihe, Jr. | 198/725 |

FOREIGN PATENT DOCUMENTS

| 428347 | 11/1946 | Italy | 198/835 |
| 731742 | 6/1955 | United Kingdom | 198/845 |

Primary Examiner—Joseph E. Valenza
Assistant Examiner—Kyle E. Shane
Attorney, Agent, or Firm—Thompson, Birch, Gauthier & Samuels

[57] ABSTRACT

A conveyor chain for a dishwashing system which chain includes a plurality of pinned links and travels on a conveyor pan and supports at least in part racks to be carried. The links are pinned for movement about a vertical axis (in a horizontal plane). Paired wheels are pinned to the links and lie in planes that form acute angles with the pan. This minimizes lateral sliding friction between the wheels of the links and the pan and therefore, wear, when the chain travels through a non-linear portion of the pan.

15 Claims, 5 Drawing Figures

CONVEYOR CHAIN FOR DISHWASHER SYSTEM

BACKGROUND AND BRIEF SUMMARY OF THE INVENTION

Conveyors used in dishwashing machines and dish collection and distribution systems are either a continuously running type such as disclosed in U.S. Pat. No. 4,004,682 or U.S. Pat. No. 3,237,755; or a continually running type with a manual or automatic stop motion mechanism, which stops the conveyor when an article being carried is obstructed.

Some conveyor chains are adapted to travel in a straight line and the connecting links are capable of movement in a vertical plane. Other conveyor chains are capable of movement in a horizontal plane. Further conveyor chains are available in which their links are pinned for movement in both horizontal and vertical planes. Some conveyor chains form an integral part of a total structure such as disclosed in U.S. Pat. No. 2,829,726. U.S. Pat. Nos. 3,768,631 and 2,328,504 each teach conveyor chains adapted for movement in two directions, which chains directly support the object to be carried. U.S. Pat. Nos. 3,334,726 and 3,237,755 are both directed to endless chains for movement in a vertical plane. U.S. Pat. No. 3,382,097 and British Patent Specification No. 767,567 appear to be the closest prior art references.

In commercially available conveyor chains for dishwashing systems, the racks in which are placed the dishes, utensils, flatware, etc. to be cleaned, are engaged by the conveyor chain and the conveyor chain carries the racks through a plurality of stations such as a pre-rinse station, a wash station, a final rinse station, etc. In some embodiments as disclosed above, the chain is used solely as a drive mechanism and the racks ride along tracks. In other systems and in the one in which the present invention is directed, the chain itself rides on a conveyor pan at least through a portion of its journey and while riding on the conveyor pan, the weight of the rack is substantially carried by the conveyor chain. Thus, the conveyor chain functions both as a drive mechanism and as a support mechanism. In systems of this type, there is of course wear between the conveyor pan and the conveyor chain particularly on the non-linear portion of the pan, i.e. where the chain turns a corner.

With these systems, the links of the conveyor chain turn about a vertical axis and the conveyor chain moves solely in a horizontal plane. The conveyor travels through both linear and non-linear portions. When the conveyor chain travels in the non-linear portion, it tends to move radially outward causing lateral sliding friction. This results in substantially increased wear on the conveyor pan in such non-linear portions and corresponding increased wear of the conveyor chain.

The present invention is directed to a conveyor chain adapted to turn solely in a horizontal plane wherein the links are pinned and turn about a vertical axis. Further, the invention is directed to the type of conveyor chain which is supported by a conveyor pan.

The conveyor chain embodying the invention has a plurality of links, each of the links having a pair of opposed non-parallel wheels or rollers, which are fixed to a link in a manner to overcome or compensate for the increased radial forces incurred when the conveyor chain moves through a non-linear section on the conveyor pan; thus, minimizing substantially the wear on a conveyor pan and correspondingly, the conveyor chain.

Broadly, the invention comprises a dishwasher conveyor chain having a plurality of links, each link including a shell portion having an upper surface, a planar tab extending forwardly of the shell portion and a planar tab extending rearwardly of the shell portion; the shell having opposed wall sections lying in planes which extend outwardly and downwardly with reference to the upper surface, wheels rotatably secured outwardly and downwardly with reference to the upper surface, the wheels adapted to engage a bearing surface and to travel along a non-linear path in a horizontal plane to minimize lateral sliding friction, the rearward tab of a first link rotatably pinned to the forward tab of a second link for relative movement about a vertical axis.

In the preferred embodiment of the invention, the axis of rotation of the wheels lie in the same plane and intersect. In an alternative embodiment, the wheels may be offset from one another such that their axes lie in distinct planes. If desired, a first shell may carry a first wheel on one side, a second succeeding shell may carry a second wheel on another side, etc.

Lastly, a drive wheel especially suited for the conveyor chain is provided. The drive wheel functions both to drive the chain and to deflect the chain toward the conveyor pan during arcuate travel.

DESCRIPTION OF THE PREFERRED EMBODIMENT

Figure 1:
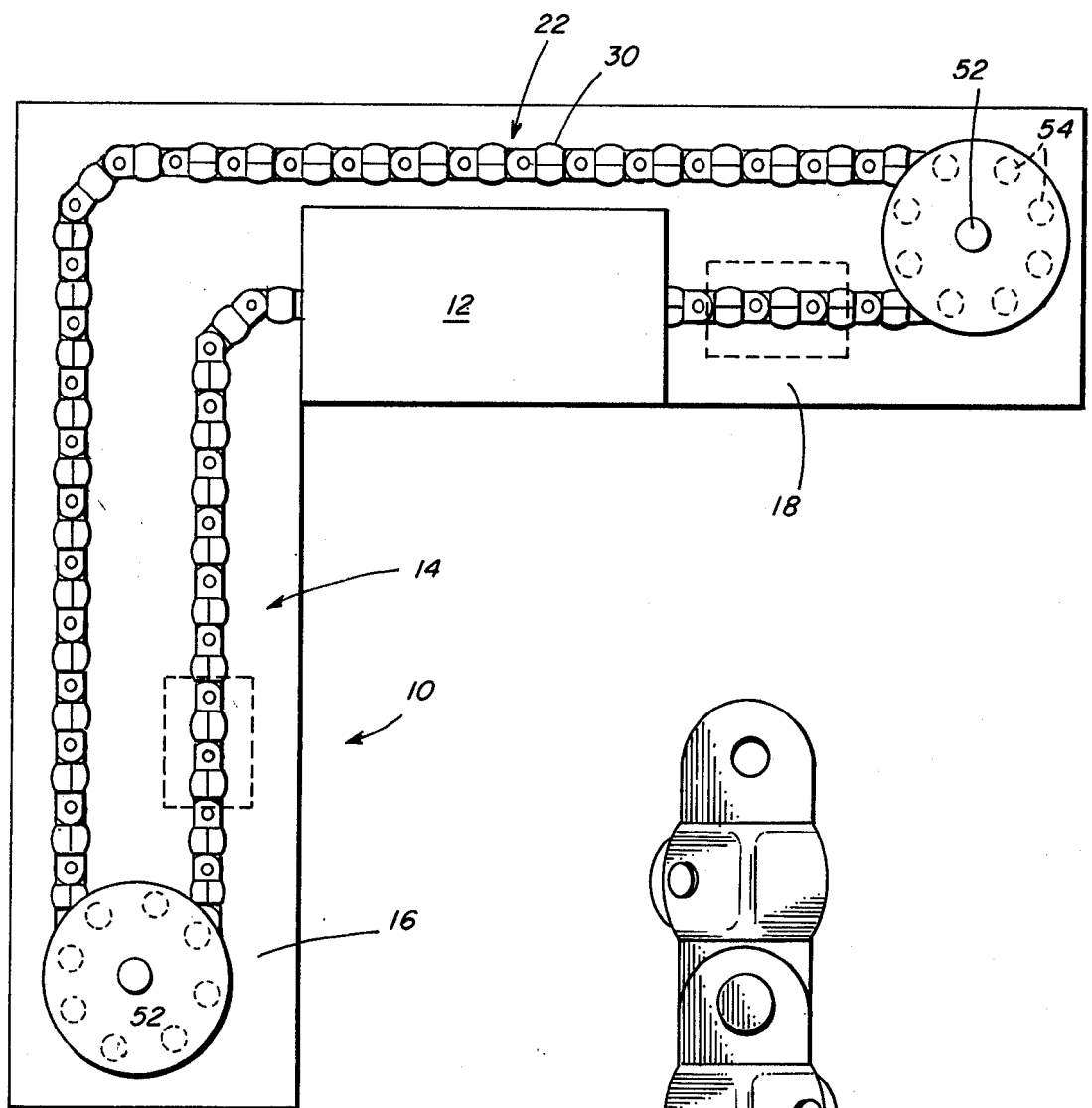
FIG. 1 is a plan view of a dishwashing system utilizing a conveyor chain embodying the invention.

A commercial washer 10 is shown in FIG. 1. It includes a housing 12 for the pre-wash, wash, pre-rinse and rinse zones, and an endless conveyor pan 14 having the loading and unloading stations 16 and 18, respectively. The pan 14 includes side walls (not shown) to restrain the lateral movement of racks and to guide the racks. The ware washer 10 is conventional and need not be described in detail. A conveyor chain 22, comprised of links 30, rides on the conveyor pan 14 and through the station 16, housing 12 and unloading station 18. When the conveyor chain passes through the housing 12 it travels in a channel and not on a pan per se. This allows the sprays in the housing to contact the articles being cleaned. Although this preferred embodiment is described in reference to a conveyor pan-channel combination on which the conveyor chain rides any structure which would support the chain is within the meaning of 'conveyor pan'. For example the chain 14 may ride entirely in a channel or on a ribbon-like strip which strip is secured to a housing etc.

Figure 2:
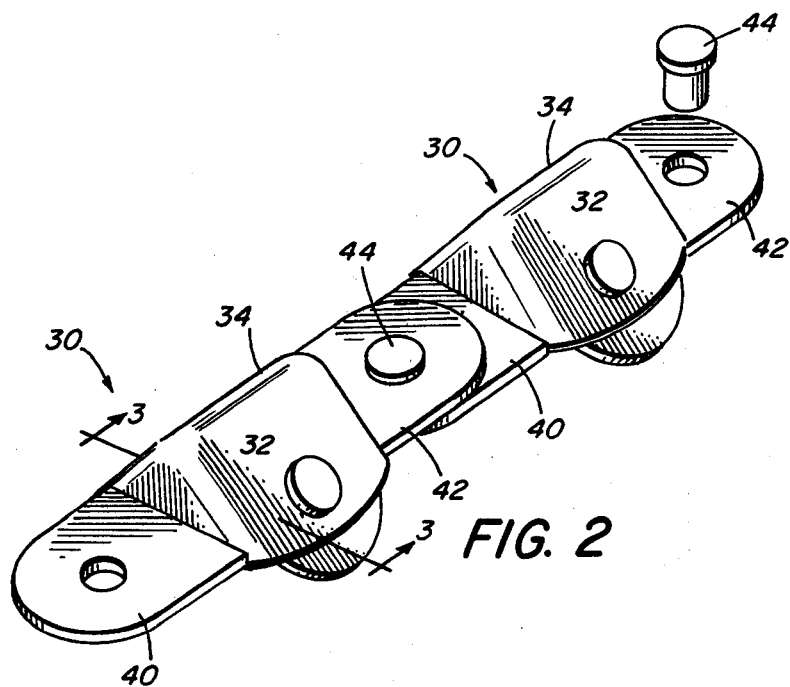
FIG. 2 is a telescopic perspective view of the links of the conveyor chain.

Referring to FIG. 2, two links 30 are shown in telescopic perspective. The links comprise a shell section 32 having an upper surface 34 shown more clearly in FIG. 3; and two opposed wall sections 36 which diverge outwardly from the surface 34 and two opposed wheels 38 pinned to the wall sections 36. Each wheel lies in a plane that is parallel to the plane of the wall section 36 to which it is pinned, and therefore, the wheels also diverge outwardly with reference to the upper surface 34. The link 30 includes a forwardly extending tab 40 and a rearwardly extending tab 42. The tab 42 is rotatably pinned, by pin 44, to the tab 40 of the next succeeding link to provide for movement of the links about a vertical axis.

As will be appreciated, the racks to be carried must necessarily have an apertured floor. Some racks will have a grid-like floor with wires or rods forming the grids. Other racks may have a flat floor with apertures formed therein. The racks will engage the upper surface either by nesting down over the upper surface or simply frictionally riding on the upper surface 34.

Figure 3:
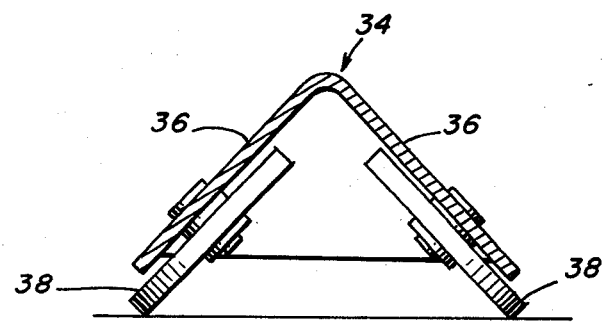
FIG. 3 is a sectional view taken along lines 3—3 of FIG. 2.

Referring to FIGS. 1, 2 and 3, as the tray moves into the curved section of the conveyor pan, the configuration of the flaired or outwardly extending wheels is such that they reduce the forces acting radially outward on the chain. Preferably, the angle defined between the wheel and the plane of the conveyor pan is 45°, but depending upon the specific operation, an angle of 10°–60° is suitable.

Figure 4:
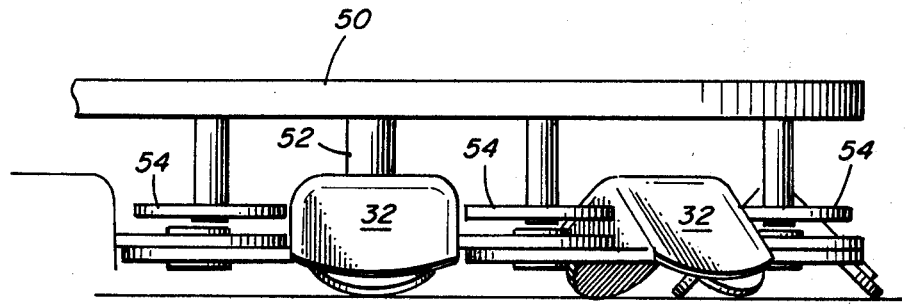
FIG. 4 is a perspective illustration of a drive sprocket engaging the conveyor chain embodying the invention.

FIG. 4 is a perspective view of a drive wheel 5' which includes a drive shaft 52 secured to the wheel 50. A plurality of wheels 54 are rotatably connected to the wheel 50 by shafts 56, circumferentially pinned to the underside of the wheel 50 as shown in FIG. 1. The wheels 54 are spaced to be received between and thus engage the shell sections 32 of succeeding links 30. In some embodiments, when the chain moves through an arcuate section, the chain tends to 'ride up'; that is, as the chain travels through an arcuate section, it tends to move upwardly away from the conveyor pan. The wheel 50 is positioned to prevent the chain from 'riding up'.

Figure 5:
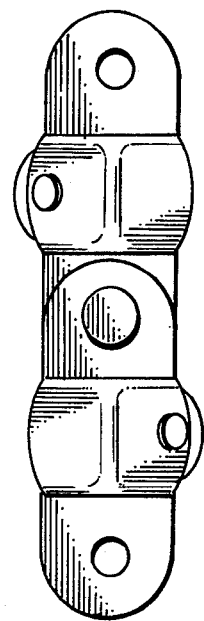
FIG. 5 is a perspective view of an alternative embodiment of the invention.

In FIG. 5, a chain 60 within the scope of the invention is shown wherein only one wheel is secured to each shell in alternating relationship.

Although a closed shell has been shown, other embodiments are within the scope of the invention; e.g., the rearward and forward walls of the shell are not necessary; the tabs can assume a different configuration. Also, the chain could ride in a track formed in the conveyor pan or between guide rails if the distance the chain travels is such that there is unwanted lateral sway of the chain.

Having described the invention, what we now claim is:

1. A conveyor chain for a dishwashing machine which comprises a plurality of links, each link including a shell portion having an upper surface, a planar tab extending forwardly of the shell portion and a planar tab extending rearwardly of the shell portion; the shell having opposed wall sections lying in planes which extend outwardly and downwardly with reference to the upper surface, wheels rotatably secured to the wall sections and lying in planes which extend outwardly and downwardly with reference to the upper surface, the wheels adapted to engage the conveyor pan and to travel along a non-linear path in a horizontal plane, the rearward tab of a first link rotatably pinned to the forward tab of a second link for relative movement about a vertical axis.

2. The conveyor system of claim 1 wherein the wheels each lie in a plane which is parallel to the plane of the wall of the shell.

3. The conveyor of claim 1 wherein the shell section includes a convex upper surface and forward and rearward walls to which the tabs are secured.

4. The conveyor of claim 1 wherein the tabs are flat.

5. A dish collection and distribution system for transporting racks which comprises:
   (a) a conveyor pan which includes a non-linear portion and which pan is adapted to support conveyor chains;
   (b) at least one continuous conveyor chain supported by the conveyor pan, the conveyor chain including a plurality of links, each link including a shell portion having an upper surface, a planar tab extending forwardly of the shell portion and a planar tab extending rearwardly of the shell portion; the shell having opposed wall sections lying in planes which extend outwardly and downwardly with reference to the upper surface, wheels rotatably secured to the wall sections and lying in planes which extend outwardly and downwardly with reference to the upper surface, the wheels adapted to engage the conveyor pan and to travel along a non-linear path in a horizontal plane, the rearward tab of a first link rotatably pinned to the forward tab of a second link for relative movement about a vertical axis.

6. A conveyor chain for a dishwashing machine which chain comprises a plurality of links, each link including a shell portion having an upper surface, a tab extending forwardly of the shell portion and a tab extending rearwardly of the shell portion, at least one wheel rotatably secured to one side of the shell, said wheel lying in a plane which extends outwardly and downwardly with reference to the upper surface of the shell; the next succeeding shell including at least one wheel rotatably secured thereto and lying in a plane which extends outwardly and downwardly with reference to the upper surface of the shell, the wheels adapted to engage the conveyor pan and to travel along a non-linear path in a horizontal plane, the rearward tab of a first link rotatably pinned to the forward tab of a second link for relative movement about a vertical axis.

7. The chain of claim 6 which includes two wheels rotatably pinned to each shell.

8. The chain of claim 7 wherein the axes or rotation of the wheels lie in the same plane and the axes intersect.

9. The chain of claim 6 wherein a first wheel is pinned to one side of a first shell and a second wheel is pinned to the other wall of a second succeeding shell.

10. A dish collection and distribution system for transporting racks which comprises:
   (a) a conveyor pan which includes a non-linear portion and which pan is adapted to support chains;
   (b) at least one continuous chain supported by the conveyor pan which chain comprises a plurality of links, each link including a shell portion having an upper surface, a tab extending forwardly of the shell portion and a tab extending rearwardly of the shell portion, at least one wheel rotatably secured to one side of the shell, said wheel lying in a plane which extends outwardly and downwardly with reference to the upper surface of the shell; the next succeeding shell including at least one wheel rotatably secured thereto and lying in a plane which extends outwardly and downwardly with reference to the upper surface of the shell, the wheels adapted to engage the conveyor pan and to travel along a non-linear path in a horizontal plane, the rearward tab of a first link rotatably pinned to the forward tab of a second link for relative movement about a vertical axis.

11. The chain of claim 10 which includes two wheels rotatably pinned to the sides of each shell.

12. The chain of claim 11 wherein the axes of rotation of the wheels lie in the same plane and the axes intersect.

13. A dish collection and distribution system for transporting racks which comprises:
 (a) a conveyor pan which includes a non-linear portion and which pan is adapted to support conveyor chains;
 (b) a drive wheel to move the conveyor which comprises:
  (i) a drive shaft;
  (ii) a drive wheel fixedly secured to the drive shaft including an upper surface and a lower surface, the lower surface defining with the conveyor pan on which the conveyor chain travels a passage, a plurality of protuberances uniformly spaced in a circumferential pattern on the drive wheel and adapted to engage upper shell portions of the conveyor chain and move the same, the drive wheel positioned to prevent unwanted upward movement of the conveyor chain;
 (c) a conveyor chain comprising a plurality of links, each link including a shell portion having an upper surface, a tab extending forwardly of the shell portion, and a tab extending rearwardly of the shell portion, at least one wheel rotatably secured to one side of the shell, said wheel lying in a plane which extends outwardly and downwardly with reference to the upper surface of the shell; the next succeeding shell including at least one wheel rotatably secured thereto and lying in a plane which extends outwardly and downwardly with reference to the upper surface of the shell, the wheels adapted to engage the conveyor pan to travel along a non-linear path in a horizontal plane, the rearward tab of a first link rotatably pinned to the forward tab of a second link for relative movement about a vertical axis.

14. A dish collection and distribution system of claim 13 wherein the conveyor chain includes a planar tab extending forwardly of the shell portion and a planar tab extending rearwardly of the shell portion, wheels rotatably secured to the wall sections of the shell and lying in planes which extend outwardly and downwardly with reference to the upper surface.

15. The dish collection and distribution system of one of claims 13 and 14 wherein the protuberances of the drive wheel are wheels rotatably pinned to the undersurface of the drive wheel, said pinned wheels are adapted to be received between succeeding shell sections of the conveyor chain.

* * * * *